United States Patent
Gause et al.

(10) Patent No.: US 10,666,123 B2
(45) Date of Patent: May 26, 2020

(54) SECONDARY ELEMENT OF A LINEAR MOTOR

(71) Applicant: ETEL S.A., Motiers (CH)

(72) Inventors: Alfred Gause, Baltmannsweiler (DE); Jose Manuel Fernandes Goncalves, Colombier (CH)

(73) Assignee: ETEL S.A., Motiers (CH)

( * ) Notice: Subject to any disclaimer, the term of this patent is extended or adjusted under 35 U.S.C. 154(b) by 546 days.

(21) Appl. No.: 15/286,586

(22) Filed: Oct. 6, 2016

(65) Prior Publication Data

US 2017/0110955 A1    Apr. 20, 2017

(30) Foreign Application Priority Data

Oct. 20, 2015  (EP) .................................. 15190522

(51) Int. Cl.
| H02K 41/03 | (2006.01) |
| H02K 1/17 | (2006.01) |
| H02K 1/18 | (2006.01) |
| H02K 5/10 | (2006.01) |

(52) U.S. Cl.
CPC ............. H02K 41/031 (2013.01); H02K 1/17 (2013.01); H02K 1/18 (2013.01); H02K 5/10 (2013.01)

(58) Field of Classification Search
CPC .......... H02K 41/031; H02K 1/17; H02K 1/18; H02K 5/10
USPC ................................................ 310/12.2, 12.1
See application file for complete search history.

(56) References Cited

U.S. PATENT DOCUMENTS

| 5,648,691 | A | * | 7/1997 | Takei | H02K 41/031 |
| | | | | | 310/12.01 |
| 6,107,703 | A | * | 8/2000 | Korenaga | H02K 41/031 |
| | | | | | 310/12.06 |
| 6,836,031 | B2 | * | 12/2004 | Emoto | G03F 7/70758 |
| | | | | | 310/12.21 |
| 8,076,804 | B2 | * | 12/2011 | Jajtic | H02K 41/031 |
| | | | | | 310/12.01 |
| 8,258,656 | B2 | * | 9/2012 | Hoppe | H02K 41/02 |
| | | | | | 310/12.01 |
| 8,541,911 | B2 | * | 9/2013 | Evers | F16F 15/023 |
| | | | | | 310/12.04 |
| 9,202,719 | B2 | * | 12/2015 | Lu | H02K 21/24 |
| 10,128,732 | B2 | * | 11/2018 | Aoyama | H02K 41/031 |
| 2003/0137199 | A1 | * | 7/2003 | Morel | H02K 41/031 |
| | | | | | 310/12.01 |
| 2008/0246350 | A1 | * | 10/2008 | Hoppe | H02K 41/031 |
| | | | | | 310/12.25 |

(Continued)

FOREIGN PATENT DOCUMENTS

| DE | 102007020057 A1 | 11/2008 |
| EP | 1230727 B1 | 8/2002 |
| EP | 1672772 A2 | 6/2006 |

(Continued)

*Primary Examiner* — Forrest M Phillips
(74) *Attorney, Agent, or Firm* — Leydig, Voit & Mayer Ltd.

(57) ABSTRACT

A secondary element of a linear motor includes magnets arranged on a magnet support. The magnet support is configured as a laminated core. Laminations of the laminated core lie parallel to a plane that is perpendicular to a direction of magnetization of the magnets. Such a secondary support advantageously provides for a simplified assembly.

8 Claims, 2 Drawing Sheets

(56) References Cited

U.S. PATENT DOCUMENTS

2010/0109449 A1* 5/2010 Hoppe .................. H02K 41/02
310/12.33
2017/0264146 A1* 9/2017 Shibata .................. H02K 41/03

FOREIGN PATENT DOCUMENTS

EP          2555396 A2   2/2013
KR       20110080879 A   7/2011

* cited by examiner

SECONDARY ELEMENT OF A LINEAR MOTOR

CROSS-REFERENCE TO PRIOR APPLICATION

Priority is claimed to European Patent Application No. EP 15 190 522.1, filed on Oct. 20, 2015, the entire disclosure of which is hereby incorporated by reference herein.

FIELD

The present invention relates to a secondary element of a linear motor. Such secondary elements constitute the passive portion of a linear motor, which includes permanent magnets arranged with alternating polarity on a magnet support, forming a magnet track along which a primary element moves. The coils of the primary element are actively energized so that magnetic fields are generated and, ultimately, forces act between the primary element and the secondary element, resulting in controlled relative movement between the primary and secondary elements.

BACKGROUND

The magnets of a secondary element are frequently made of relatively brittle materials. For this reason, and because of their strong magnetic forces, which strongly attract, for example, iron filings, the magnets are frequently shielded from the environment.

EP 1230727 B1 describes protecting the magnets of a secondary element by means of cover strips made of a plastic material and arranged laterally along the magnet track. This plastic material is flexible and can also be adapted to curved magnet tracks. The magnets are additionally protected by a covering tape that is placed on the magnets and also rests laterally on the cover strips, so that the magnets are shielded from the environment on all sides. However, in these secondary elements, the positioning of the magnets on the magnet support is a very complex process.

KR 20110080879 A describes placing the magnets into a grid-like frame of plastic that has previously been glued to the magnet support. The frame helps in the proper positioning of the magnets and protects the magnets. Again, a cover is mounted on the frame and the magnets, so that the magnets are completely enclosed from the environment. Here too, the magnets are covered by a multi-part cover, which makes assembly more complex.

DE 102007020057 A1 describes linear motors where the primary element and the secondary element include laminated cores, the individual laminations of which form cooling channels once assembled. This eliminates the need for additional cooling serpentines or machining steps for creating the cooling channels. As usual, the laminations are oriented such that their plane lies parallel to the direction of the magnetic field in the air gap of the motor so as to suppress eddy currents as effectively as possible.

SUMMARY

In an embodiment, the present invention provides a secondary element of a linear motor. Magnets are arranged on a magnet support. The magnet support is configured as a laminated core. Laminations of the laminated core lie parallel to a plane that is perpendicular to a direction of magnetization of the magnets.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
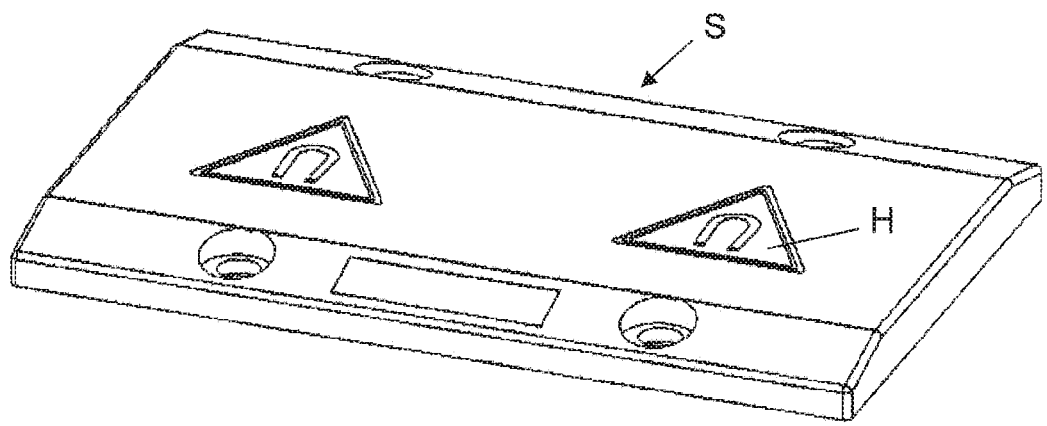
FIG. 1 is an external view of the secondary element.

In an embodiment, the present invention improves the known secondary elements so as to simplify their assembly.

According to an embodiment, the present invention provides a secondary element of a linear motor, the secondary element having magnets arranged on a magnet support. The magnet support is configured as a laminated core, the laminations of which lie in a plane perpendicular to the direction of magnetization of the magnets.

This is because it has been recognized by the inventors that for optimum suppression of eddy currents, the laminations of the laminated core do not necessarily have to be oriented parallel to the direction of magnetization of the magnets as is usual in the prior art. However, by orienting the laminations parallel to a plane perpendicular to the direction of magnetization of magnets M, significant advantages are achieved in the manufacture of the secondary element. Thus, the laminations lie parallel to the plane in which the magnets are arranged, and thus also parallel to the plane of the air gap of the linear motor.

By arranging the laminations in the laminated core of the secondary element in this way, it is possible to provide the laminations with apertures during their manufacture so that when stacking and connecting the laminations to form a laminated core, assembly apertures are created which extend perpendicularly through the laminated core and serve for attachment of the magnet support to a machine part. Until now, such assembly apertures had to be formed posteriorly in the magnet support in additional production steps. These steps can be eliminated if suitable holes are made already during the punching or cutting of the individual laminations. However, this is only possible if the laminations lie perpendicular to the direction of magnetization of the magnets, and thus parallel to the plane defined by the secondary element, because such apertures would cause conventionally arranged laminations to fall into a plurality of separate parts.

Therefore, arranging the laminations perpendicular to the direction of magnetization in accordance with an embodiment of the present invention enables simple manufacture of a very compact magnet support composed of a small number of lamination layers. For example, for a typical linear motor, five to ten layers of 0.65 mm thick laminations are sufficient to form a magnet support.

Such laminated cores are available with excellent properties (high magnetic conductivity, for example of SiFe or CoFe). Eddy currents in the magnet support are suppressed due to the mutually insulated laminations. Moreover, such laminated cores can be manufactured in a wide variety of shapes and with different apertures in a particularly simple and cost-effective manner by assembling laminations formed in different shapes (e.g., by punching or laser cutting) and connecting them to form the cores (a process also referred to as stacking). Complex machining processes, which would otherwise be required to mill magnet supports from solid material, are eliminated as is the expensive coating of conventional magnet supports required to protect them from corrosion.

In order to obtain compact, rugged and well-protected secondary element, additional measures are provided. For example, the secondary element has a cover for the magnets which, together with the magnet support, encloses the magnets and protects them from environmental influences. It is a feature of this secondary element that the cover is provided on its inner side with first ribs that extend in between the magnets. The cover used in this approach can be manufactured in one piece, integrating both a protective function for the magnets as well as an assembly aid for positioning the magnets, which, in the prior art, must be provided as a separate device.

Moreover, the cover has second ribs against which rests a first leg of a non-magnetic angular or L-shaped elongated member projecting from the magnet support and extending in the longitudinal direction of the secondary element, the second leg of which is secured to the magnet support.

This elongated angular member is preferably made from stainless steel and has two functions. Due to its angular cross section, the elongated angular member gives the secondary element much additional strength, allowing the magnet support to be made considerably thinner than is otherwise customary. For reasons of stability, magnet supports are frequently made significantly thicker, and thus heavier, than would be necessary to conduct the magnetic fields of the magnets. Owing to the elongated angular members, the magnet supports can now be made thinner and lighter in weight. Moreover, the leg projecting from the magnet support serves for positioning the magnets, because the magnets are laterally positioned and held by the projecting legs.

The cover is designed as an injection-molded part, in whose inner region facing the magnets and the magnet support, the first and second ribs allow both the magnets and the elongated angular members to be positioned particularly easily and accurately even before they are actually mounted to the magnet support. Once the magnets and elongated angular members are placed in the cover, they are already positioned relative to one another, and it is then only necessary to position the cover on the magnet support and secure it thereto. This step is facilitated by centering apertures and pins or other mating shapes on the cover and the magnet support.

Since the cover is designed as an injection-molded part, its outer side may very easily be provided with warnings about strong magnetic fields or with a logo of the manufacturer. Once created in the injection mold, such warnings do not require any additional manufacturing steps. The color of the plastic used may also provide information to the user. For example, information about the strength of the magnets may be indicated by a color code.

The cover provides, in a single, easy-to-make component, both an assembly aid and protection of the magnets from mechanical damage and corrosion. Unlike in the prior art, there is no need to assemble a complete cover from a plurality of component parts.

The elongated angular members can be prefabricated in long lengths and cut to the required length, which makes stocking easier. Furthermore, the second leg resting on the magnet support may be provided with V-shaped incisions at certain intervals, which allows for magnet tracks that are curved in the plane of the magnets. The incisions allow the elongated angular members to be bent to the required curvature.

An exemplary embodiment of the present invention will be described in more detail with reference to the figures.

FIG. 1 shows a secondary element according to an embodiment of the present invention in the fully assembled condition. In this view, only cover A can be seen, which conceals all other components of secondary element S. Cover A completely surrounds secondary element S laterally and above permanent magnets M. On cover A, there can be seen warnings H, which were already formed therein during the manufacture of cover A by means of a suitable injection mold.

Figure 2:
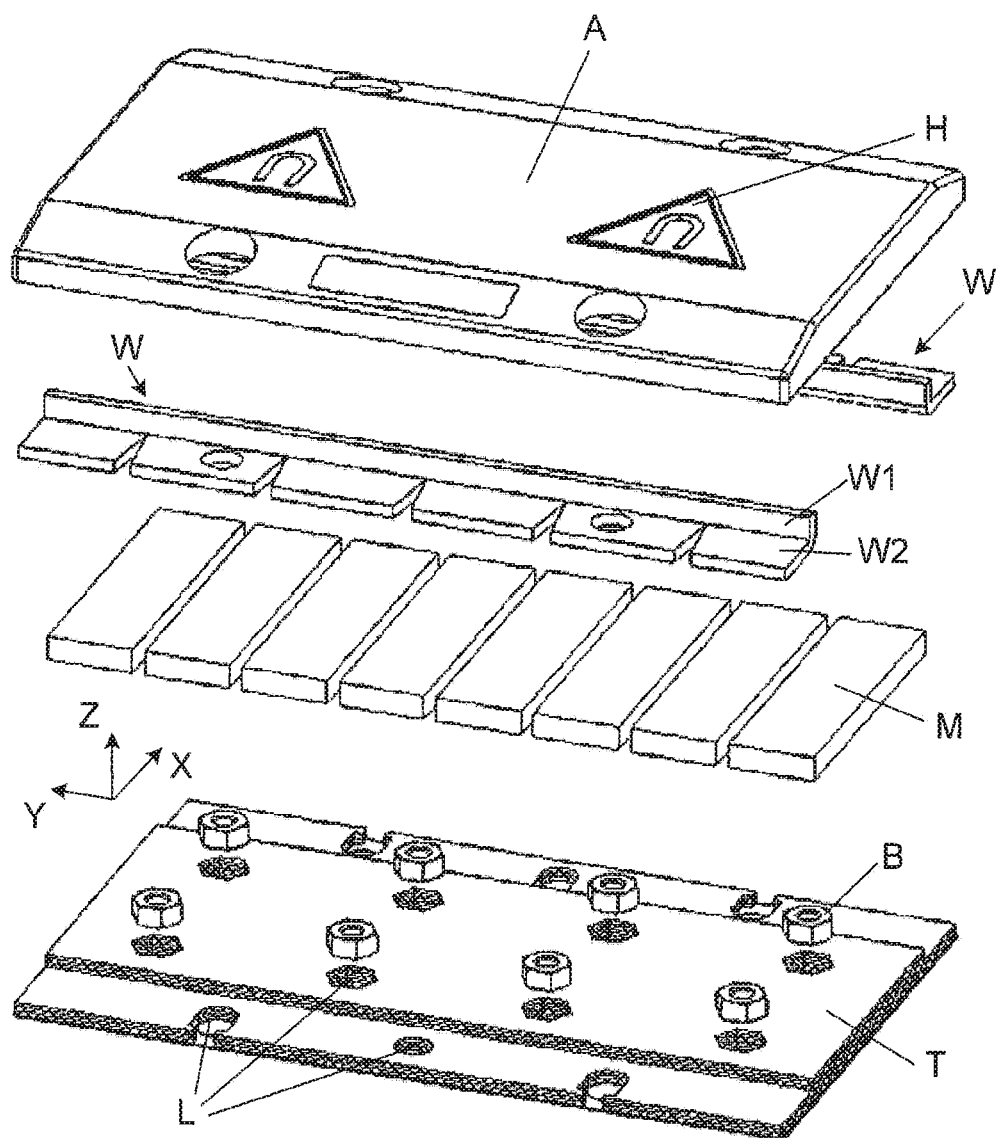
FIG. 2 is an exploded view of the secondary element, as seen obliquely from above.
Figure 3:
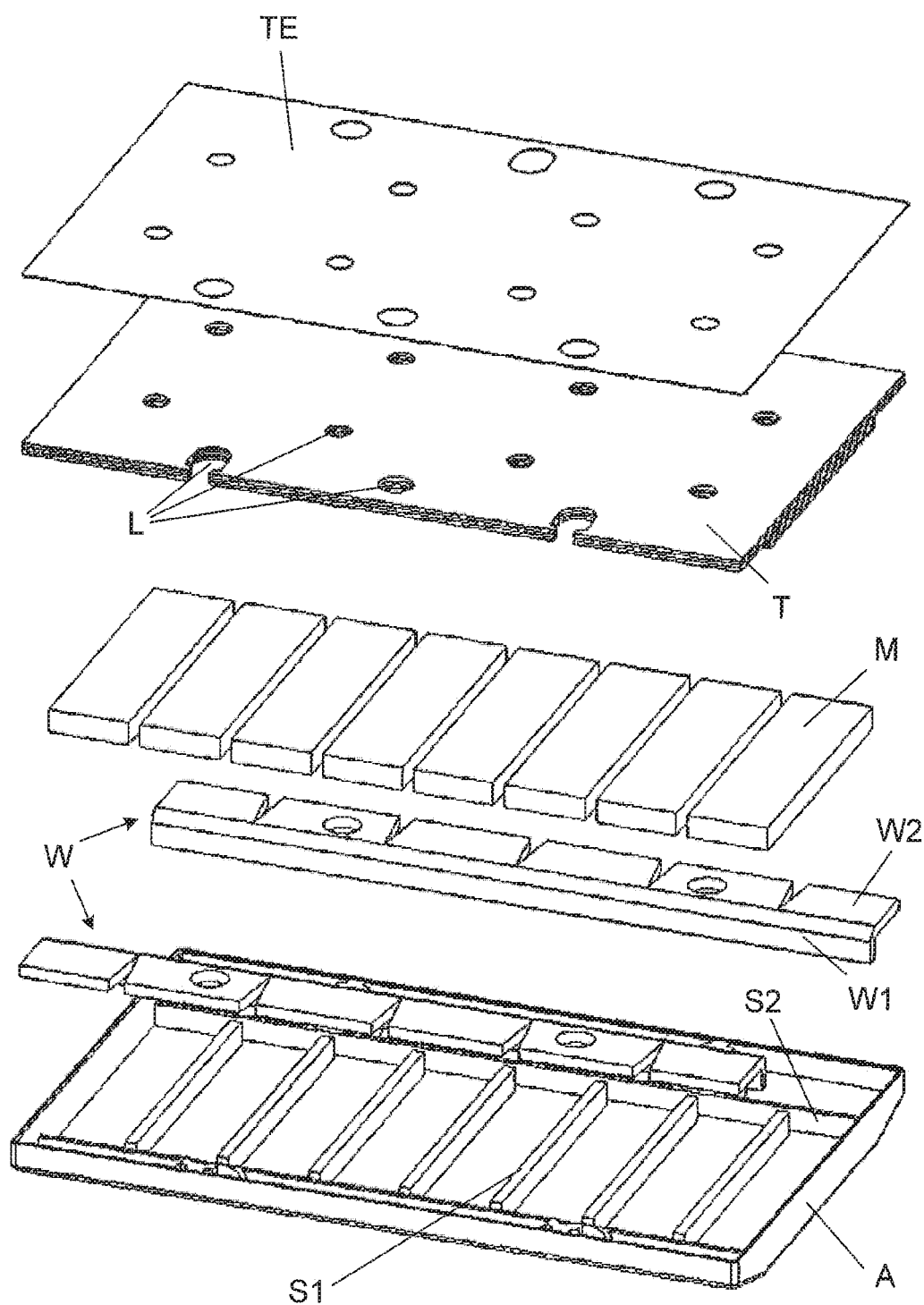
FIG. 3 is an exploded view of the secondary element, as seen obliquely from below.

FIGS. 2 and 3 are exploded views showing secondary element S from two different directions.

Magnet support T can be seen, on which magnets M are arranged with alternating polarity. Magnet support T is configured as a laminated core whose outer shape is determined by the shape of the individual laminations thereof. This eliminates the need for complex milling operations to form assembly apertures L through which screws or centering pins may be passed, or which may receive fastening means B such as, for example, nuts. As the example of the nuts B shows, it is also possible to eliminate the need for cutting threads.

The assembly apertures L extending through magnet support T in the Z direction can be formed already during the manufacture of the individual laminations of magnet support T only because the individual laminations lie parallel to a plane X-Y perpendicular to direction of magnetization Z of magnets M. In other words, the laminations lie parallel to a plane defined by the length of the secondary element in the Y direction and the width of secondary element S in the X direction. Thus, the laminations also lie parallel to the air gap of the linear motor. Therefore, assembly apertures L can be created by punching or cutting holes into the individual laminations.

By using suitably punched laminations, it is possible very easily to form even assembly apertures L that must have different radii or even cornered shapes (a larger, cornered aperture for non-rotatably receiving nut B on the magnet side, a smaller radius for receiving a screw on the rear side of magnet support T).

FIG. 2 further shows two elongated angular members W, which are arranged on both sides of magnets M, and the first leg W1 of which project from magnet support T, while second leg W2 is secured to the magnet support T. The projecting first leg W1 contact magnets M laterally and fix them transversely to the magnet track during the assembly process. Attachment of the second legs to magnet T may be accomplished by screws or also by clamps or interlocking slip-fit connections.

Further details are apparent from FIG. 3, which provides a view of the inner region of cover A facing magnet M.

In cover A, first ribs S1 can be seen, which extend in between magnets M, so that magnets M are also fixed in the direction of the magnet track (i.e., in the direction of movement of the linear motor) so as to facilitate the assembly of secondary element S.

Second ribs S2 extending perpendicular to first ribs S1 in cover A each provide a contact face for a first leg W1 of an elongated angular member W, so that ultimately the inner face of each first leg W1 contacts a magnet M, while the outwardly facing face of each first leg W1 contacts a second rib S2. Thus, the two second ribs S2, as it were, clamp two elongated angular members W and the magnets M therebetween.

A clearance or gap exists between second ribs S2 and the respective ends of first ribs S1 to receive the projecting first legs W1 of elongated angular members W.

Cover A encloses magnet support T laterally, so that magnets M disposed inside cover A are completely protected by cover A and magnet support T from adverse environmental influences. The laminated core of magnet support T is also protected by cover A in this manner, since the edges of the laminations projecting laterally from magnet support T are covered by the lateral boundaries of cover A.

A protective bottom cover TE rests against the rear side of magnet support T. This cover TE may be an additional ferromagnetic lamination, or may alternatively take the form of, for example, a carbon-fiber-reinforced epoxy resin sheet or a sheet of stainless steel. This further enhances the protection of the secondary element from environmental influences.

Magnet support T, bottom cover TE, cover A and elongated angular members W may have corresponding apertures and/or projections which provide for mutual alignment of the components for assembly, possibly together with a centering pin.

It can also be seen from FIGS. 2 and 3 that each of the second legs W2 of elongated angular members W, which legs rest on magnet support T, has V-shaped incisions allowing elongated angular members W to be adapted to curved magnet tracks.

In order to assemble secondary element S, initially cover A is positioned and fixed on an assembly fixture in such a way that the inner region of cover A is accessible for insertion of elongated angular members W and magnets M. Next, elongated angular members W are inserted as described above, thereby defining a desired position for magnets M.

Some glue is applied to those areas on the inside of cover A against which magnets M will later rest. Next, magnets M are inserted into cover A. In the process, coils located in the assembly fixture generate a magnetic field that holds magnets M in place in cover A. Otherwise, there would be a risk that an already inserted magnet M could be torn away from its place as additional magnets M are inserted or during placement of support T. Additional glue is then applied to the still exposed underside of magnets M and/or also to magnet support T.

Possibly, centering pins are inserted into cover A or support T, and nuts B are inserted into associated assembly apertures L of support T. Nuts B may be glued into assembly apertures L, fixed in place by screws from the rear side of support T, or held in place in assembly apertures L by small magnets on the rear side of support T so as to prevent them from falling out during the remainder of the assembly process.

Support T is then placed on cover A as indicated in FIGS. 2 and 3. Subsequently, the coils of the assembly fixture can be de-energized, because now magnets M are securely fixed in place on support T. Finally, bottom cover TE is glued to the rear side of support T.

Secondary element S is then pressed together by the assembly fixture until the glue has set and a very compact secondary element S has been produced that is protected from external influences.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A secondary element of a linear motor, the secondary element comprising:
   magnets arranged on a magnet support, the magnet support being configured as a magnetically conductive laminated core, wherein laminations of the laminated core lie parallel to a plane that is perpendicular to a direction of magnetization of the magnets.

2. The secondary element as recited in claim 1, wherein the laminations of the laminated core are shaped such that the magnet support has assembly apertures extending through the magnet support parallel to the direction of magnetization.

3. The secondary element as recited in claim 2, wherein nuts are inserted into the assembly apertures from a side of the magnets and non-rotatably held therein.

4. The secondary element as recited in claim 1, further comprising a cover which, together with the magnet support, encloses the magnets so as to protect the magnets from environmental influences, the cover having an inner side including first ribs that extend in between the magnets and second ribs against each of which rests a first leg of a respective one of two non-magnetic elongated angular members projecting from the magnet support and extending in the longitudinal direction of the secondary element, the respective second leg of the elongated angular members being secured to the magnet support.

5. The secondary element as recited in claim 4, wherein the first leg of each of the elongated angular members has a respective contact face for the magnets.

6. The secondary element as recited in claim 4, wherein the cover comprises a plastic material.

7. The secondary element as recited in claim 4, wherein the elongated angular members comprise stainless steel.

8. A linear motor having a secondary element comprising:
   magnets arranged on a magnet support, the magnet support being configured as a magnetically conductive laminated core, wherein laminations of the laminated core lie parallel to a plane that is perpendicular to a direction of magnetization of the magnets.

* * * * *